E. T. STUART.
VERMIN DESTROYING NEST EGG.
APPLICATION FILED APR. 11, 1922.

1,425,348.

Patented Aug. 8, 1922.

Inventor
Edwin T. Stuart,
By
Attorney

UNITED STATES PATENT OFFICE.

EDWIN T. STUART, OF WEST FORK, ARKANSAS, ASSIGNOR OF ONE-HALF TO CHARLES R. CAUHN, OF WEST FORK, ARKANSAS.

VERMIN-DESTROYING NEST EGG.

1,425,348. Specification of Letters Patent. Patented Aug. 8, 1922.

Application filed April 11, 1922. Serial No. 551,574.

*To all whom it may concern:*

Be it known that I, EDWIN T. STUART, a citizen of the United States of America, residing at West Fork, in the county of Washington and State of Arkansas, have invented new and useful Improvements in Vermin-Destroying Nest Eggs, of which the following is a specification.

The object of the invention is to provide a nest egg whereby a plurality of medicaments, remedies and insecticides may be dispensed therefrom either in the form of a powder or a liquid or by fumes or in two or more ways thereof in the treatment of prevalent or possible diseases or affections or as a preventative from such diseases to which the poultry may be exposed or be subject particularly during the setting period; and with this object in view the invention consists in a construction and combination of parts of which a preferred embodiment is shown in the accompanying drawings, wherein:—

Figure 1:
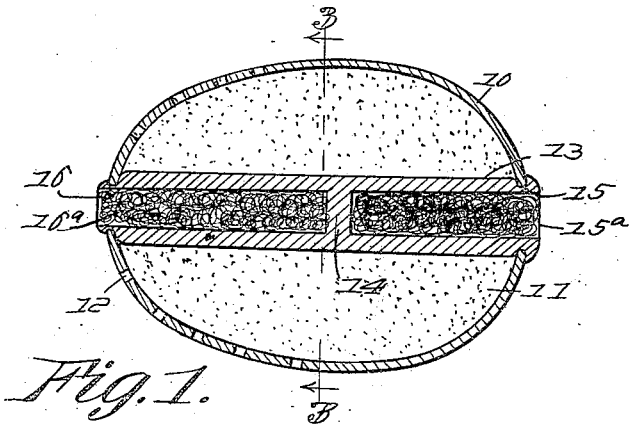
Figure 1 is a sectional view.
Figure 2:
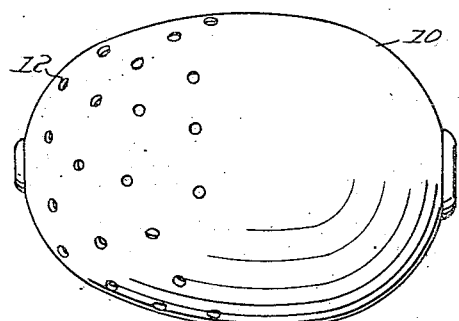
Figure 2 is a side view of a nest egg embodying the invention.
Figure 3:
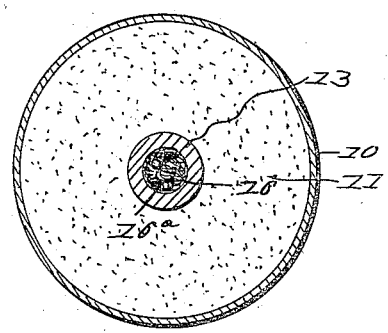
Figure 3 is a transverse section on the plane indicated by the line 3—3 of Figure 1.

The nest egg 10 embodying the invention in addition to being hollow as indicated to form a chamber 11 for containing an insecticide in powdered form as shown and which is adapted to be distributed through the outlet openings or orifices 12 is designed especially to distribute one or more medicaments in the form of vapors or fumes as a means for example of treating the disease known as scaleyleg and at the same time distribute fumes of a liquid designed for a different disease not subject to successful treatment by the ordinary powdered forms of insecticides, and to this end there is provided a tube 13 extending longitudinally or axially through the shell formed by the oval wall 10, terminally secured in suitable openings in the shell and provided at an intermediate point with a partition 14 so as to provide separate longitudinally disposed pockets 15 and 16 which are adapted to be fitted with porous plugs or as indicated in the drawings to be provided with fibrous fillers 15$^a$ and 16$^a$ which can be saturated with a liquid of a volatile character possessing the required properties.

In this way the nest egg while performing its original and conventional function of distributing the insecticide to maintain the nest in a sanitary condition under ordinary circumstances may also be provided with a plurality of means for treating special conditions or diseases to which the fowl may be subject during the setting period or which are prevalent at the time and which may be contracted by the setting hen during said period, although obviously the utility of this treatment or method of treatment also extends to such fowls as may use the nest for laying purposes, with the advantage that this means of applying the treatment insures the impregnation of the feathers of the laying fowls without requiring special or manual application.

The egg proper may be made of any suitable substance which is preferably of a substance that is elastically yieldable, such as rubber.

Having described the invention, what is claimed as new and useful is:—

A nest egg having a hollow shell for the reception of a powdered filler and provided with perforations for distributing the same, and a tubular receptacle extending longitudinally through the shell and having open ends for the reception of medicated fillers, the receptacle being provided with an intermediate partition to form separate compartments respectively accessible through opposite ends of the tube.

In testimony whereof he affixes his signature.

EDWIN T. STUART.